Oct. 27, 1970   L. GOERDEN ET AL   3,536,549
METHOD AND APPARATUS FOR MAKING RESIN
IMPREGNATED GLASS FIBER MATS
Filed March 21, 1967
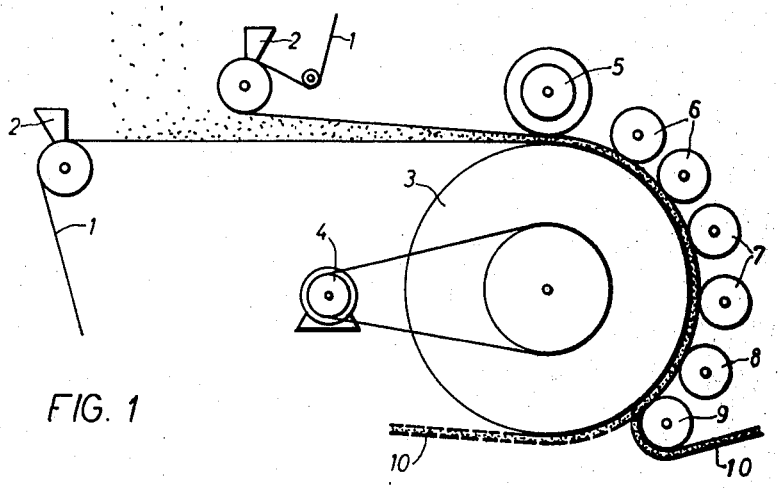
FIG. 1
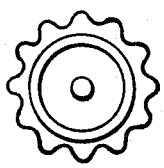 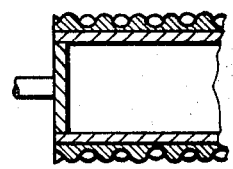
FIG. 2   FIG. 3
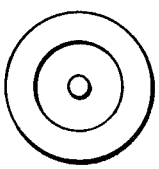 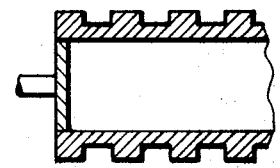
FIG. 4   FIG. 5
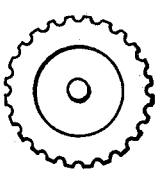 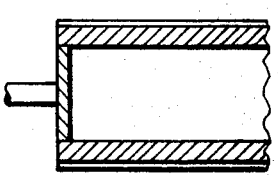
FIG. 6   FIG. 7
INVENTORS:
LEONHARD GOERDEN, RAINER GRÜNEWALD, JOACHIM KROSCH.
BY Burgess, Dinklage & Sprung
ATTORNEYS

United States Patent Office 3,536,549
Patented Oct. 27, 1970

3,536,549
METHOD AND APPARATUS FOR MAKING RESIN IMPREGNATED GLASS FIBER MATS
Leonhard Goerden, Oedt, and Rainer Grunewald and Joachim Krosch, Krefeld-Bockum, Germany, assignors to Farbenfabriken Bayer Aktiengesellschaft, Leverkusen, Germany, a corporation of Germany
Filed Mar. 21, 1967, Ser. No. 624,790
Claims priority, application Germany, Apr. 1, 1966, F 48,831
Int. Cl. B32b 5/02
U.S. Cl. 156—62.2    4 Claims

ABSTRACT OF THE DISCLOSURE

Method and apparatus for production of composite foil-glass fiber-foil mats by interposing glass fiber between two distinct foils, at least one of which is coated on the surface thereof facing the other foil with a polyester resin material; and subjecting the composite foil-resin-glass fiber-foil article to compacting, kneading, and then leveling through a series of roll pair nips. The process can be carried out with a series of roll pairs or with a series of single or multiple rollers pressed against a single large substrate roller acting in opposition to each.

---

The invention relates to a process for the production of glass fibre reinforced mold mats in which glass fibres are introduced between two continuous webs of foil which cover the glass fibre and at least one of which is coated with a polyester resin composition.

In the known process of this kind resin compositions of low viscosity are used, and the process has proved to be suitable for example for the manufacture of flat or corrugated light plates. When attempts are made to employ this process using resin compositions of high viscosity, considerable difficulties arise in achieving impregnation of the glass fibres with the resin. The resin compositions of high viscosity give rise to difficulties, especially if they contain fillers. If a foil is continuously coated with such a resin composition and the necessary quantity of glass fibres is scattered over it, no impregnation occurs. If the glass fibres do in fact become wetted with the resin composition after they have been exposed to it for a considerable time, separation of the constituents is observed. This is due to the fact that a part of the fillers is held back by the filtering action of the elementary fibres, and preferential entry of the resin constituents into the fibres takes place. It is not possible either to achieve satisfactory impregnation by use of slight pressure in known manner. If the pressure is increased, the unbound glass fibres first clump together while the foil together with resin composition slides forward underneath. After a short time, a thick roll of glass fibres forms which again holds back the resin composition which then moves away sideways. In addition, the increased pressure exerts a strong braking action on the support foil and consequently the foil gets stretched and finally torn.

It is the object of the invention to avoid the disadvantages described above.

According to the invention, this object is accomplished by subjecting the structure made up of a supporting foil and a covering foil and the layer of glass fibres and resins successively to calendering, rolling and levelling. Calendering causes the loose glass fibre layer, which may have been preliminarily compacted when the webs of foil are introduced into the wedge formed by the two foils to be pressed into the resin layer which is applied to at least one of the foils. A fixing of the glass fibres is achieved by this procedure.

Complete impregnation of the fibres is then effected in the operation of rolling the glass fibres into the resin layer which follows. In the simplest case, it is sufficient to carry out a single rolling operation in which those fibres which are not yet impregnated are pressed into the resin layer. This rolling process is advantageously carried out in several stages, in which case the speed of production and thickness of the resin mat may be increased. During this process, pressure zones are formed which are distributed over the whole width and between which a pressure gradient is formed. The pressure zones are staggered in relation to each other in the individual stages.

Lastly, the weight per unit surface area is made uniform with a levelling roller. The various stages of the process may be carried out successively in separate zones arranged over part of the circumference of a rotatable drum. The process according to the invention may advantageously be combined with a second application of resin on to the covering foil. The resin is applied by known methods, e.g. by means of coating knives. If a second layer of resin is used, the thickness of the resin mat can be considerably increased and a more uniform product can be obtained.

In the process described, any length of glass fibres may be chosen. In principle, one may also use endless filaments and impregnate them.

An apparatus for carrying out the process advantageously consists of a drum on which the individual stages of the process can be carried out. The drum is driven. It is positioned after the device for feeding in the foil and the glass fibres, and the device is so arranged that a wedge is formed between the two foils, that is the supporting and covering foil. The glass fibre layer is fixed in position by means of one or more rollers which have surface protuberances. The protuberances are preferably made of elastic material. The elastic material itself produces a certain kneading effect. The contact pressure is variable and is so chosen that the glass fibres will be sufficiently firmly in the resin layer. If the roller which has the surface protuberances is too heavy, the load may have to be reduced. This roller causes substantial impregnation of the glass fibres, and a smooth roller then suffices for completing the impregnation and for levelling. For this purpose, it is advantageous to use a roller with an elastic surface.

If, in the production of thick mold mats, the rollers with protuberances cause only localized fixation, complete impregnation can be achieved by intensive kneading and rolling processes. These rolling processes can advantageously be carried out with grooved rollers by the use of which pressure gradients are formed between the contours of the roller, so that one the one hand pressure is realized from the mold mat in certain parts and on the other hand a powerful rolling and kneading action is directed on other parts. The grooves of the roller should preferably be arranged circumferentially. The grooved rollers may be of any diameter but not less than 100 mm. The height of the radial ridges should be at least equal to the thickness of the resin mat, preferably 6 to 10 mm. The width of the ridges must be such that on the one hand the covering foil is not damaged and on the other hand no material accumulates in front of the ridge. The width is preferably 5 to 10 mm. The gap must be such that the material which is moved away by the pressure can be taken up without the cover foil being stretched. The width of the gap is preferably twice to three times the width of the ridge. By arranging one or more grooved rollers in a staggered row, the entire surface will be exposed to the rolling and kneading operation. Finally, the mold mat is levelled by one or more rollers. The transition from kneading rollers to levelling rollers can be facilitated by interposing rollers which are slightly grooved longitudinally.

If the stages of the process described above are carried out on a large drum, the drive which drives the large drum is sufficient, owing to the wide opening angle, whereas if the different stages of the process are carried out separately between individual pairs of rollers, the rollers should be driven individually because otherwise the braking effect will exceed the tensile strength of the foils. A stretching of the foils causes orientation of the glass fibres and non-uniformity in the weight per unit area.

Embodiments of an apparatus for carrying out the process are shown diagrammatically by way of example in the drawing.

FIG. 1 shows a side view of the impregnating station,

FIGS. 2 and 3 show the roller with protuberances in front view and in longitudinal section, FIGS. 4 and 5 show one of the kneading rollers (circumferentially grooved rollers) in front view and in longitudinal section, and FIGS. 6 and 7 show a levelling roller (axially grooved roller) in front view and in longitudinal section.

In the production of mold mats with cut fibres of glass, the supporting and the covering foil 1 are conveyed to the impregnating station (FIG. 1) in known manner. A resin composition is applied by means of a coating device 2 to one or both foils. The coated foils together with the glass fibres which have been scattered over them in known manner are conveyed to the drum 3 which is driven by an infinitely variable drive 4. Preliminary compacting is assisted by a roller of large diameter with soft surface 5. The glass fibre layer is fixed by means of one or more rollers 6 with surface protuberances (see FIGS. 2 and 3). Final impregnation of the fibres is effected between drum 3 and one or more kneading rollers 7 (FIGS. 4 and 5), also named grooved rollers. Levelling of the impregnated resin mat may be effected by an axially grooved roller 8 as shown in FIGS. 6 and 7. Depending on the space available, the mold mat 10 may be drawn off over a deflecting roller 9 or straight from the drum in other direction, as indicated in broken lines.

We claim:

1. In a process for the production of resin impregnated glass fiber mats, the steps comprising providing at least two distinct foils, at least one of which is coated on the surface thereof facing the other such foil with a polyester resin material; depositing glass fibers on said coated foil surface; forcing said foils toward each other between a first pair of rollers; passing the thus produced composite article between at least one second pair of rollers, at least one of which second rollers has surface protuberances thereon; passing said article from said second pair of rollers through at least one third pair of rollers, wherein one of said third rollers has circumferential grooves thereon; and passing said article from said third pair of rollers, at least one of which fourth pair of rollers has axial grooves thereon.

2. Process as claimed in claim 1, wherein said composite article is subjected to the action of said roller pairs by passing such about a single roller having a relatively large diameter and providing appropriately spaced smaller rollers having the surface configurations described on the surface of the composite article opposite to said large roller, and exerting pressure thereon.

3. Process as claimed in claim 1, wherein the surface of said rollers is at least partially elastic.

4. Apparatus for making resin impregnated glass fiber mats claimed in claim 1, which comprises a first guide means adapted to feed a first foil; a second guide means adapted to feed a second foil; means adapted to distribute glass fibers between said first and second foils; a relatively large-diameter roller operatively associated with at least one of said foils; a first roller operatively associated with said large-diameter roller adapted to guide both of said foils through the nip thereof; a second roller means having surface protuberances thereon having a common nip with said large-diameter roller and following in train sequence said first roller; at least one third roller means having circumferential grooves thereon having a common nip with said large-diameter roller and following in trains sequence said second roller; and at least one fourth roller means having axial grooves and having a common nip with said large-diameter roller and following in train sequence said second roller; and at least one fourth roller means having axial grooves and having a common nip with said large-diameter roller and following in train sequence said third roller.

References Cited

UNITED STATES PATENTS

| | | | |
|---|---|---|---|
| 2,290,608 | 6/1942 | Evans | 156—595 |
| 3,109,763 | 11/1963 | Finger | 156—374 |
| 3,163,689 | 12/1964 | Ives | 156—231 |

FOREIGN PATENTS 146  10/1952  Republic of the Philippines.

OTHER REFERENCES

Bjorksten, Polyesters and Their Applications, Reinhold, New York (1956), pages 14, 15 and 187 relied on.

Clapp et al., Engineering Materials and Processes, Internat'l Text. Co., Scranton, Pa. (1938), page 2 relied on.

Ellis, Chemistry of Synthetic Resins, Reinhold, New York (1935), page 885 relied on.

JOHN T. GOOLKASIAN, Primary Examiner

W. E. HOAG, Assistant Examiner

U.S. Cl. X.R.

156—62.2, 276, 324, 332, 372; 264—109